United States Patent [19]

Palardy

[11] Patent Number: 5,843,238
[45] Date of Patent: Dec. 1, 1998

[54] METHOD AND COMPOSITION FOR ENHANCING THE DEWATERING OF STARCH

[75] Inventor: William J. Palardy, Chalfont, Pa.

[73] Assignee: BetzDearborn Inc., Trevose, Pa.

[21] Appl. No.: 916,827

[22] Filed: Aug. 22, 1997

[51] Int. Cl.$^6$ .................................................. C08B 30/06
[52] U.S. Cl. ................................................ 127/65; 127/71
[58] Field of Search .......................................... 127/45, 71

[56] References Cited

U.S. PATENT DOCUMENTS

| | | | |
|---|---|---|---|
| 3,928,631 | 12/1975 | Freeman et al. | 426/18 |
| 4,345,948 | 8/1982 | Breuninger | 127/70 |
| 4,393,202 | 7/1983 | Breuninger | 536/102 |
| 5,283,322 | 2/1994 | Martin et al. | 530/374 |
| 5,536,326 | 7/1996 | Stocker | 127/67 |

OTHER PUBLICATIONS

CA 119:273947, Tsubone et al, "Cleaning compositions with mildness to skin" Sep. 7, 1993.

*Primary Examiner*—David Brunsman
*Attorney, Agent, or Firm*—Alexander D. Ricci; Richard A. Paikoff

[57] ABSTRACT

A method and composition for enhancing the dewatering of starch are disclosed, the composition comprising a combination of a polyoxyethylene-polyoxypropylene (EO-PO) block copolymer and sodium lauryl sulfate.

7 Claims, No Drawings

METHOD AND COMPOSITION FOR ENHANCING THE DEWATERING OF STARCH

BACKGROUND OF THE INVENTION

Starch, the principal reserve polysaccharide in plants, constitutes a substantial portion of the human diet. It is the principal component of most seeds, tubers, and roots and is produced commercially from corn, wheat, rice, tapioca, potato, and other sources. Most commercial starch is produced from corn which is comparatively inexpensive and abundant throughout the world. Wheat, tapioca, and potato starch are produced on a smaller scale and at higher prices.

Starch is a mixture of linear (amylose) and branched (amylopectin) polymers of $\alpha$-D-glucopyranosyl units. Natural starch occurs usually as granules composed of both linear and branched starch molecules. However, some starches are composed only of branched molecules, and these are termed waxy starches because of the vitreous sheen of a cut seed surface. Some mutant seed varieties have been produced with starches having up to 85% linear molecules, although most starches have approximately 25% linear and 75% branched molecules.

The milling of corn provides corn starch, which is extensively used in food and non-food applications. Corn may be dry-milled using screening and air classification of particle size, but this process does not completely separate oil, protein, starch, and hull. Better separation is obtained by wet-milling. (A complete description of the milling process may be found in the Kirk-Othmer Encyclopedia of Chemical Technology, 3rd Edition, Volume 21, pages 492–507, 1983.) In the corn-milling operation, the corn is first cleaned by screening to remove cob, sand, and other foreign material, and then by aspiration to remove the lighter dust and chaff. It is then placed in large vats, called steeps, for the steeping process of softening the kernels for milling. Steeping requires a careful control of water flow, temperature (48°–52° C.), sulfur dioxide concentration (about 0.1%), and a pH at 3–4.

The primary objective of corn wet milling is the separation of the four main constituents of the kernel, namely starch, gluten (primarily corn protein), germ, and fiber (primarily hull). Water is used throughout the wet milling process to soften the kernel and as a conveying medium between the downstream unit operations. This water is subsequently removed via mechanical and thermal processes to achieve the desired moisture content of the final products.

In the wet-milling process, the starch suspension may be processed dry and marketed as unmodified corn starch, modified by chemical or physical means, gelatinized and dried, or hydrolyzed to corn syrup.

In the production of corn starch (both chemically modified and unmodified), excess water is typically removed from starch slurries using rotary vacuum filters. The dewatering may also be carried out by such means as plate and frame filtration, or by centrifugation. An improvement in mechanical dewatering efficiency will dramatically reduce evaporation load on the starch dryers and result in reduced energy requirements for this process.

It is a goal of the present invention to improve the performance of the means employed in the dewatering process to dewater a starch slurry. In other words, by decreasing the moisture content of starch, the effectiveness of the drying process (the final step in starch manufacture) is improved. The final product may then be employed in various industrial uses.

DETAILED DESCRIPTION OF THE INVENTION

The present invention relates to a process and composition for enhancing the dewatering of starch, which composition comprises the combination of a polyoxyethylene-polyoxypropylene (EO-PO) block copolymer and sodium lauryl sulfate. Note that both of these materials are commercially available and are approved for direct human consumption.

In accordance with the present invention, the combined EO-PO block copolymer and sodium lauryl sulfate treatment may be added to the desired system in need of starch dewatering, in an amount of from about 200 to about 1,000 parts of the combined treatment to one million parts (by weight) of the dry solids content of the starch slurry. Preferably, about 350 to about 700 parts of the combined treatment per one million parts (by weight) of the starch slurry is added.

The EO-PO block copolymer has a number average molecular weight between about 1,000 and 5,000, with a number average molecular weight between about 1,500 and 2,500 being preferred. The weight ratio of EO-PO block copolymer to sodium lauryl sulfate is from about 1:1 to 5:1, with a weight ratio of components of from about 2:1 to 4:1 being preferred.

The following experimental data were developed. It is to be remembered that the following examples are to be regarded solely as being illustrative, and not as restricting the scope of the invention.

DESCRIPTION OF PREFERRED EMBODIMENT

The EO-PO block copolymer and sodium lauryl sulfate were added in varying ratios and over a wide range of concentrations. All individual component tests were conducted at a dosage of 500 ppm of the active materials based on the dry solids content of the slurry being treated.

All tests were conducted using process samples provided by a major U.S. corn starch manufacturing facility. Samples consisted of dried starch which was reslurried in the laboratory to match process conditions.

A standard filter leaf test apparatus was used to simulate the rotary vacuum filter. For the filter leaf test studies of the present invention, the media assembly was modified to allow filter paper to be used instead of filter cloth. This eliminated any potential residual effect in sequential treatment testing and any potential of fouling the cloth which might have masked treatment results.

The experiments consisted of placing the starch slurry sample at approximately 100° F. into an agitated beaker. The vacuum level was established at 17 or 24" Hg vac (two different vacuum levels were used to cover the operating range used in the industry, with no observable effect on filtration performance). The beaker agitation was stopped, and simultaneously the media assembly was inserted into the starch. After allowing 30 seconds for the cake to form, the assembly was removed from the beaker and inverted to allow drainage of filtrate from the assembly. Vacuum was maintained for an additional 30 seconds to simulate the cake drying time found in industrial rotary vacuum filters. The cake was then analyzed for dry substance content (% dry solids, or d.s.) using a standard oven method.

TABLE I

Starch Filtration Experimental Results

| Treatment | Treatment Rate (ppm) DS Basis | % Moisture of Filter Cake | Δ Moist. (Avg. Control-Treated) |
|---|---|---|---|
| Control (avg.) | | 45.64 | |
| A (avg.) | 500 | 44.25 | 1.38 |
| B (avg.) | 500 | 44.42 | 1.21 |
| A/B | 125/375 | 45.26 | 0.37 |
| A/B | 250/250 | 44.29 | 1.35 |
| A/B | 375/125 | 40.79 | 4.85 |

A: EO-PO block copolymer
B: Sodium lauryl sulfate

As noted above, a 75%/25% blend of the EO-PO block copolymer (mw=2,000) and sodium lauryl sulfate were particularly effective in starch dewatering. When dosed at a combined 500 ppm (375 ppm of the EO-PO block copolymer and 125 ppm of the sodium lauryl sulfate), the moisture content of the filter cake was reduced almost twice as much as either component by itself at 500 ppm.

While this invention has been described with respect to particular embodiments thereof, it is apparent that numerous other forms and modifications of the invention will be obvious to those skilled in the art. The appended claims and this invention generally should be construed to cover all such obvious forms and modifications which are within the true spirit and scope of the present invention.

I claim:

1. A method for enhancing the removal of water from starch which comprises adding to an aqueous starch slurry, during the wet milling of said starch, an amount, effective for the purpose of a composition comprising (a) a polyoxyethylene-polyoxypropylene block copolymer surfactant and (b) sodium lauryl sulfate.

2. The method as recited in claim 1 wherein from about 200 to 1,000 parts per million of said composition is added to said aqueous starch slurry.

3. The method as recited in claim 2 wherein from about 350 to 700 parts per million of said composition is added to said aqueous starch slurry.

4. The method as recited in claim 1 wherein said polyoxyethylene-polyoxypropylene block copolymer surfactant has a number average molecular weight between about 1,000 and 5,000.

5. The method as recited in claim 3 wherein said polyoxyethylene-polyoxypropylene block copolymer surfactant has a number average molecular weight between about 1,500 and 2,500.

6. The method as recited in claim 1 wherein the weight ratio of (a):(b) is from about 1:1 to 5:1.

7. The method as recited in claim 6 wherein the weight ratio of (a):(b) is about 3:1.

* * * * *